United States Patent
Liao et al.

(10) Patent No.: US 12,149,069 B2
(45) Date of Patent: Nov. 19, 2024

(54) JUMPER CABLE, INTEGRATED STARTING POWER SUPPLY DEVICE, AND STARTING AND IGNITING METHOD

(71) Applicant: GUANGDONG BOLTPOWER ENERGY CO., LTD, Dongguan (CN)

(72) Inventors: Yuefei Liao, Dongguan (CN); Ruiguang Huang, Dongguan (CN)

(73) Assignee: GUANGDONG BOLTPOWER ENERGY CO., LTD, Dongguan (CN)

( * ) Notice: Subject to any disclaimer, the term of this patent is extended or adjusted under 35 U.S.C. 154(b) by 579 days.

(21) Appl. No.: 17/467,480

(22) Filed: Sep. 7, 2021

(65) Prior Publication Data

US 2022/0069574 A1    Mar. 3, 2022

Related U.S. Application Data

(63) Continuation of application No. PCT/CN2019/130116, filed on Dec. 30, 2019.

(30) Foreign Application Priority Data

Mar. 7, 2019   (CN) .......................... 201910173476.8

(51) Int. Cl.
*H02J 7/00* (2006.01)
*H02J 1/10* (2006.01)
*H02J 7/34* (2006.01)

(52) U.S. Cl.
CPC ............ *H02J 1/122* (2020.01); *H02J 7/0034* (2013.01); *H02J 7/0047* (2013.01); *H02J 7/342* (2020.01)

(58) Field of Classification Search
USPC ......................................... 320/106
See application file for complete search history.

(56) References Cited

U.S. PATENT DOCUMENTS 10,148,105 B2 * 12/2018 Lei .................... H02J 7/0063
2006/0145655 A1 * 7/2006 Sheng ................ H02J 7/0034
                                                          320/105

* cited by examiner

*Primary Examiner* — Samuel Berhanu (57) ABSTRACT

The present disclosure is applicable to the technical field of vehicles, and provides a jumper cable for emergency start of vehicles, an integrated starting power supply device, and a vehicle starting method. The jumper cable includes input terminals, clamping ends, and a charging portion. The charging portion includes a main charging circuit, a bypass charging circuit, and a microcontroller. The microcontroller is configured to control the bypass charging circuit to be switched on to pre-charge a vehicle battery and control the main charging circuit to be switched on to charge the vehicle battery when a relative relationship between an output voltage and an input voltage of the bypass charging circuit meets a preset loading condition so as to enable a vehicle to be started and ignited.

20 Claims, 5 Drawing Sheets

JUMPER CABLE, INTEGRATED STARTING POWER SUPPLY DEVICE, AND STARTING AND IGNITING METHOD

TECHNICAL FIELD

The present disclosure belongs to the technical field of vehicles, and particularly relates to a jumper cable for emergency start of vehicles, an integrated starting power supply device, and a vehicle starting method.

BACKGROUND

The start and ignition of a vehicle may be completed by using electric energy stored by a vehicle battery under a normal condition. However, if the energy stored in the vehicle battery is insufficient due to aging of the vehicle battery or other factors, the vehicle must be started and ignited by means of an additional starting power supply.

When the vehicle is started and ignited by means of the additional starting power supply, a smart jumper cable (hereinbelow referred to as "jumper cable") needs to be used to connect the starting power supply and the vehicle battery. The existing jumper cable for emergency start of vehicles mainly works in the following manners.

1. After the vehicle battery is clamped by the jumper cable, if it is detected that a voltage of the vehicle battery drops (decreases), it indicates that the vehicle is started and ignited, and the battery may be connected and maintained for 3 s, such that the starting power supply communicates with the positive and negative polarities of the vehicle battery, and the starting power supply is capable of supplying power for igniting the vehicle. However, when the voltage of the vehicle battery is very low (for example, the voltage of the battery is less than 0.2V), the existence of the battery may not be identified through detecting the voltage of the battery, let alone the drop of the voltage of the battery, and thus the jumper cable will not be switched on. By this time, the starting power supply is unable to supply power to the vehicle battery even if the starting power supply is available, and thus, the vehicle can not be started and ignited.

2. When the presence of the vehicle battery is detected, the jumper cable is switched on, the starting power supply is connected with the vehicle battery all the time for 30 s (or other period of time), the vehicle may be normally started by an operator within this time period. However, if the jumper cable is switched on for 30 s or longer time, due to relatively high capacity, the vehicle battery may generate a large current within the turned-on time to use up power of the starting power supply, thereby resulting in reduction of the number of ignition times of the starting power supply, and meanwhile, accelerating the aging of the battery.

3. Due to a certain factor (for example, the vehicle battery has been thoroughly incapable of storing power and completely useless, and the voltage of the battery is lower than 1V), the jumper cable is unable to detect the presence of the vehicle battery, but the operator knows that the jumper cable has been connected with the battery. The operator may forcedly turn on the jumper cable by means of a button (or a switch), thereby igniting the vehicle. In this manner that the jumper cable is forcedly switched on by means of the button, firstly, the operation complexity is increased, manual operation is required, and if manual judgement is incorrect, for example, the battery is short-circuited, by this time, forcedly turning on the jumper cable leads to short circuit of the starting power supply, which may result in overheating burning of the jumper cable or serious heating of the battery, thereby causing a fire. Secondly, the material cost is increased, and high prices are caused.

SUMMARY

Technical Problem

The technical problem to be solved by the present disclosure is to identify a vehicle battery and start and ignite the vehicle when the power of the vehicle battery is very low, thereby effectively avoiding short circuit.

Solution

In order to solve the above-mentioned technical problem, in a first aspect, an embodiment of the present disclosure is achieved in such a way: provided is a jumper cable for emergency start of vehicles, including input terminals configured to be connected with a starting power supply, clamping ends configured to be clamped on electrodes of a vehicle battery, and a charging portion connected between the input terminals and the clamping ends, wherein the charging portion is configured to charge the vehicle battery via the clamping ends with electric energy received from the starting power supply by the input terminals;

the charging portion includes:
- a main charging circuit connected between the input terminals and the clamping ends and configured to charge the vehicle battery in a large-current form when being controlled to be switched on;
- a bypass charging circuit connected between the input terminals and the clamping ends and configured to pre-charge the vehicle battery when being controlled to be switched on; and
- a controller configured to control the bypass charging circuit to be switched on first to pre-charge the vehicle battery and controlling the main charging circuit to be switched on to charge the vehicle battery when it is detected that a relative relationship between an output voltage and an input voltage of the bypass charging circuit meets a preset loading condition such that a vehicle is started and ignited.

In a second aspect, an embodiment of the present disclosure further provides an integrated starting power supply device, including a starting power supply and a jumper cable described above, wherein the starting power supply includes a battery portion, a temperature sampling module, and a MCU, wherein the temperature sampling module is configured to detect the temperature of the battery portion and transmit a signal of the temperature to the MCU, and the MCU transmits an indication signal to the jumper cable to stop working when the temperature of the battery portion is overhigh.

In a third aspect, an embodiment of the present disclosure further provides an emergency starting method for a vehicle, applied to a jumper cable for emergency start of vehicles, wherein the jumper cable includes input terminals configured to be connected with a starting power supply, clamping ends configured to be clamped on electrodes of a vehicle battery, and a charging portion connected between the input terminals and the clamping ends, wherein the charging portion is configured to charge the vehicle battery via the clamping ends with electric energy received from the starting power supply by the input terminals; and the vehicle starting and igniting method includes the following steps:

controlling the bypass charging circuit to be switched on to pre-charge the vehicle battery; and controlling the main charging circuit to be switched on to charge the vehicle battery in a large-current form when it is detected that a relative relationship between an output voltage and an input voltage of the bypass charging circuit meets a preset loading condition so as to enable the vehicle to be started and ignited.

Advantages

A bypass charging circuit is provided in the embodiment of each of the above-mentioned aspects. The vehicle battery can be pre-charged by the bypass charging circuit when the power of the vehicle battery is very low so as to identify whether the battery is a real battery or load, the main charging circuit is controlled to charge the vehicle battery when the vehicle battery is pre-charged to meet the preset loading condition, and therefore, short circuit can be effectively avoided.

DESCRIPTION OF THE EMBODIMENTS

In order to make the objectives, technical solutions, and advantages of the present disclosure clearer and more comprehensible, the present disclosure will be further described in detail below with reference to the accompanying drawings and the embodiments. It should be understood that the specific embodiments described herein are merely intended to explain the present disclosure, rather than to limit the present disclosure.

A bypass charging circuit is provided in each embodiment of the present disclosure. A vehicle battery is pre-charged by the bypass charging circuit when the power of the vehicle battery is very low, and the main charging circuit is controlled to charge the vehicle battery when the vehicle battery is pre-charged to meet a preset loading condition.

Figure 1:
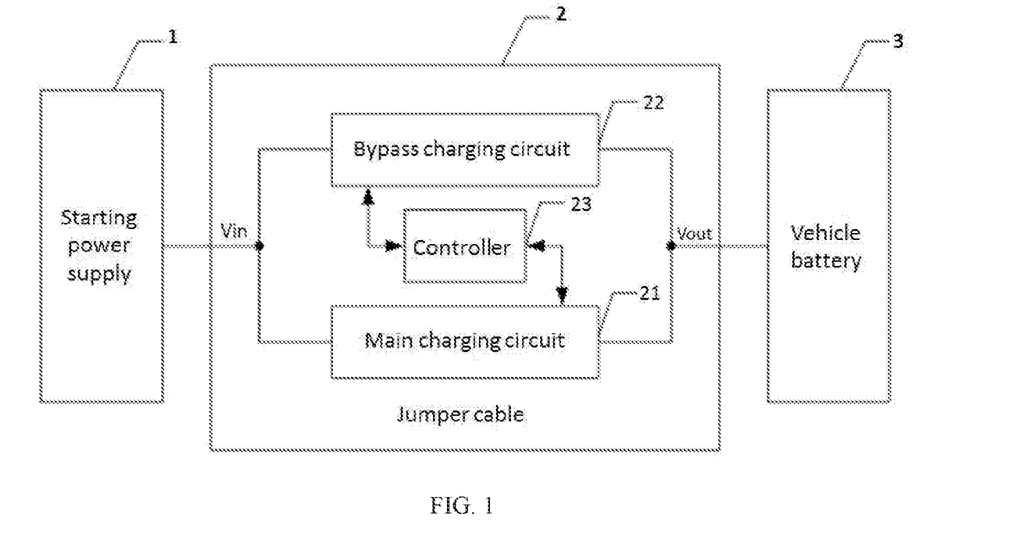
FIG. 1 is a schematic diagram of a jumper cable according to a first embodiment of the present disclosure.

Based on the above-mentioned principle, FIG. 1 shows a structural principle of a jumper cable provided in a first embodiment of the present disclosure, and the jumper cable may be used for emergency start of vehicles. Reference is made to FIG. 1 in which a jumper cable 2 is connected between a starting power supply 1 and a vehicle battery 3, and when the energy stored in the vehicle battery is insufficient due to aging of the vehicle battery or other factors, the starting power supply 1 charges the vehicle battery 3 via the jumper cable 2 such that the vehicle is started and ignited.

The jumper cable 2 is provided with input terminals Vin and clamping ends, wherein the input terminals Vin are connected with the starting power supply 1. During use, the clamping ends need to be clamped on electrodes of the vehicle battery 3, and the damping ends also serve as voltage output terminals Vout of the jumper cable 2. In addition, the jumper cable 2 further includes a charging portion connected between the input terminals Yin and the clamping ends, and the charging portion is configured to charge the vehicle battery 3 via the clamping ends by using electric energy received by the input terminals Vin from the starting power supply 1, and forming a charging circuit together with the input terminals Vin and the damping ends.

Figure 2:
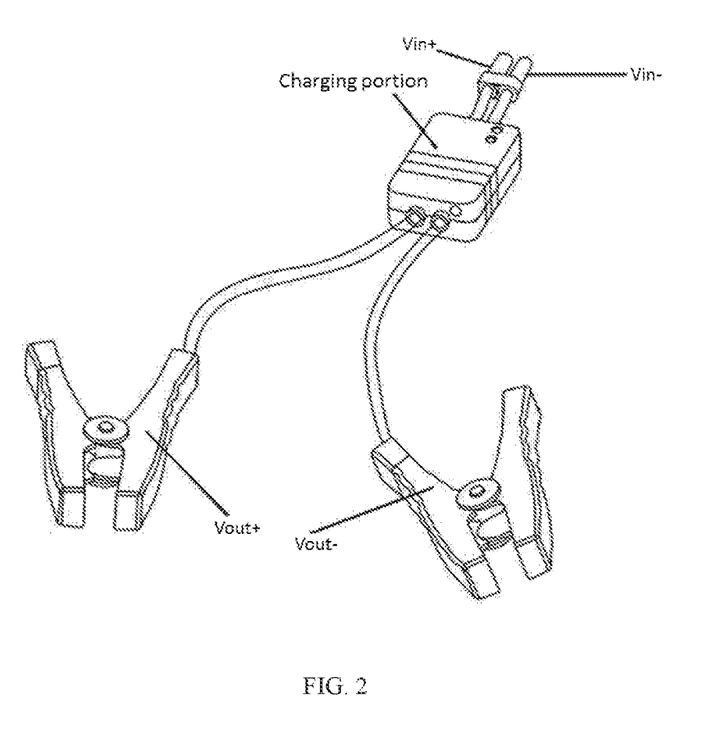
FIG. 2 is a perspective view of the jumper cable according to the first embodiment of the present disclosure.

FIG. 2 shows an appearance of the jumper cable. During use, the two input terminals Vin+ and Vin− are respectively connected with the positive and negative electrodes of the starting power supply 1, and the two clamping ends Vout+ and Vout− are respectively clamped on the positive and negative electrodes of the vehicle battery 3.

The above-mentioned charging portion includes a main charging circuit 21, a bypass charging circuit 22 and a controller 23.

The main charging circuit 21 is electrically connected between the input terminals Yin and the clamping ends and configured to charge the vehicle battery 3 when being controlled to be switched on. The bypass charging circuit 22 is electrically connected between the input terminals Yin and the clamping ends and configured to pre-charge the vehicle battery 3 when being controlled to be switched on.

The controller 23 is configured to control the bypass charging circuit 22 to be switched on to pre-charge the vehicle battery 3, and control the main charging circuit 21 to be switched on to charge the vehicle battery 3 when it is detected that a relative relationship between an output voltage and an input voltage of the bypass charging circuit 22 meets a preset loading condition, such that the vehicle is started and ignited.

In the present embodiment, the preset loading condition is related to a relative relationship between the output voltage and the input voltage of the bypass charging circuit 22. When the relative relationship between the output voltage and the input voltage of the bypass charging circuit 22 meets the preset loading condition, it can be determined that the output terminals of the jumper cable 2 is connected with a load, and thus, the main charging circuit 21 may be controlled to be switched on to perform ignition judgment; or else, it can be determined that no load is connected with the output terminals of the jumper cable 2, and thus, ignition judgment is not performed. Specifically, the output voltage of the jumper cable 2 may be set to be lower than the input voltage by a certain value or more, such as lower than the input voltage by than 0.3V or more.

In the first embodiment, the bypass charging circuit 22 may be controlled to pre-charge the vehicle battery 3 so as to identify whether the battery is a real battery or load, the main charging circuit 21 is controlled to charge the vehicle battery 3 when the vehicle battery 3 has been pre-charged to meet the preset loading condition, and therefore, the false triggering of the short circuit can be effectively avoided.

Figure 3:
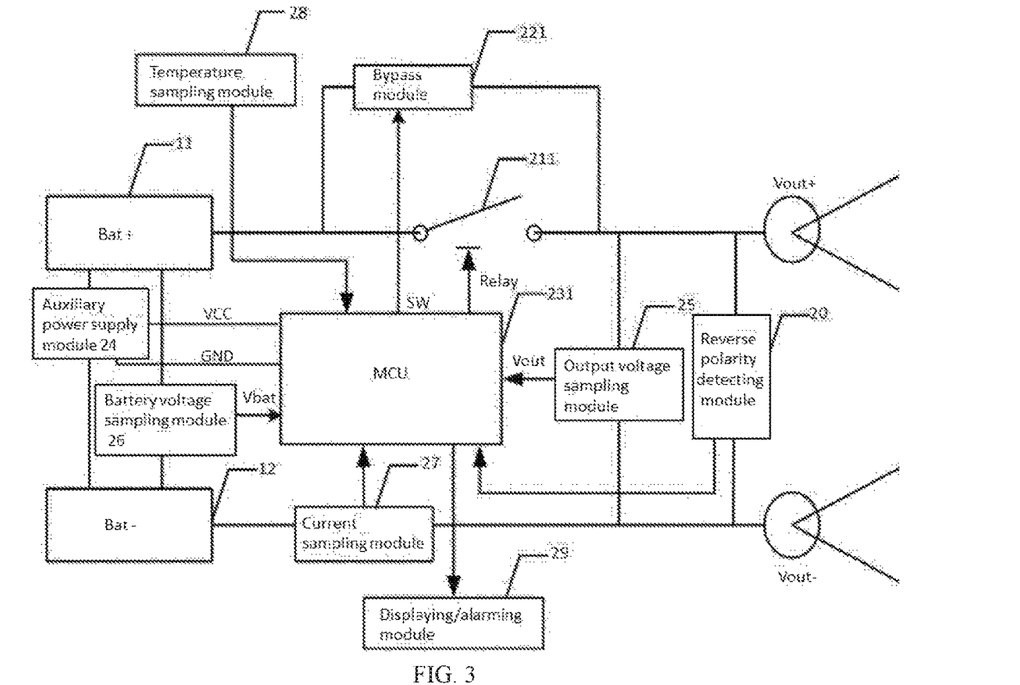
FIG. 3 is a diagram showing a circuit structure of a charging portion of a jumper cable according to a second embodiment of the present disclosure.

In combination with the first embodiment, a second embodiment of the present disclosure provides a circuit structure of the above-mentioned charging portion. As shown in FIG. 3, Bat+ represents a positive electrode 11 of the starting power supply 1, Bat− represents a negative electrode 12 of the starting power supply 1, and Vout+ and Vout− respectively represent the two clamping ends configured to be clamped on the positive and negative electrodes of the vehicle battery 3.

The main charging circuit 21 of the charging portion is mainly used as a large-current circuit by which the vehicle can be started conveniently. As shown in FIG. 3, the main charging circuit 21 includes a main switch 211; when the main switch 211 is controlled to be switched on, a connection in circuit is formed between the starting power supply 1 and the vehicle battery 3 to realize charging; and when the main switch 211 is controlled to be turned off, the starting power supply 1 stops charging the vehicle battery 3 by the main charging circuit 21. The main switch 211 may be formed based on a relay, or a plurality of parallel switches (such as parallel MOSFETs) or other switches applicable to large currents.

The bypass charging circuit 22 of the charging portion includes a bypass module 221. Similarly, the bypass module 221 is achieved based on a bypass switch which may be MOSFETs with body diodes having opposite conductivity directions, or a signal relay, an optical coupler or the like. When the bypass switch is controlled to be switched on, a connection in circuit is formed between the starting power supply 1 and the vehicle battery 3 to realize pre-charging; and when the bypass switch is controlled to be turned off, the starting power supply 1 stops pre-charging the vehicle battery 3 by the bypass charging circuit 22. In addition, the bypass module 221 may further include a current-limiting resistor and/or diode by which an overlarge circuit flowing through a bypass circuit or reverse charging of a current is avoided.

Figure 4:
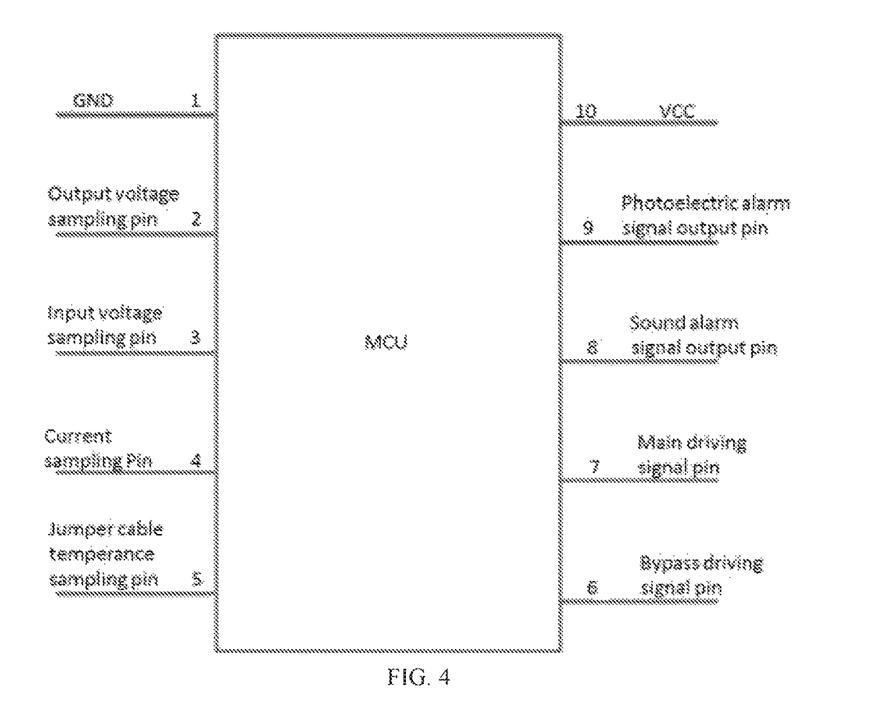
FIG. 4 is a schematic diagram showing the pins of a MCU in FIG. 3.

The controller 23 is achieved based on a MCU 231, which, for example, may be a MCU with a model of HR7P169B or HR7P153 or HT66F0175 or HT66F0172. FIG. 4 shows portions of pins of the MCV 231, wherein a pin 1 and a pin 10 are respectively a GND end and a power input terminal VCC, which are configured to supply power to the MCU 231, and may obtain power from a connection of the jumper cable 2 and the starting power supply 1, or the clamping ends of the jumper cable 2 which are connected with the vehicle battery 3. The jumper cable 2 is capable of working as long as one of the ends is available, and thus, the MCU 231 may give a status prompt. A pin 2 is an output voltage sampling end and is configured to sample output, voltages of the clamping ends of the jumper cable 2. A pin 3 is an input voltage sampling end and is configured to sample an input voltage at the connection of the jumper cable 2 and the starting power supply 1. A pin 4 is a current sampling end and is capable of sampling a current of the starting power supply 1 flowing to the jumper cable 2, or sampling a current of the jumper cable 2 for reversely charging the starting power supply 1. By sampling the reversed current, the starting power supply 1 can be prevented from being reversely charged, and the starting power supply 1 is protected. A pin 5 is a jumper cable temperature sampling end. A pin 6 is a bypass driving signal end SW, which is configured to output a driving signal to the bypass module 221 so as to control the bypass module 221 to be switched on. A pin 7 is a main driving signal pin and is configured to output a driving signal to the main switch 211 so as to control the main switch 211 to be switched on. A pin 8 is a sound alarm signal output terminal, which is configured to give sound prompt information to prompt a user to pay attention to the current state. It is connected with sounding equipment such as a buzzer. A pin 9 is a photo-electric alarm signal output terminal and may be connected with LED lamps or LED nixie tubes for display. There may be one or more LED lamps which may have different colors. The nixie tubes may also have different colors for displaying numerical values or characters so as to prompt different working states, such as a current pre-charged state by the bypass charging circuit 22 or charged state by the main charging circuit 21, and the temperature state of the jumper cable 2.

Further, as shown in FIG. 3, the charging portion further includes an auxiliary power supply module 24 connected with the positive electrode 11 and the negative electrode 12 of the starting power supply 1 as well as the GND pin (the pin 1) and the VCC end (the pin 10) of the MCU 231, to receive power from the starting power supply 1 and convert the power into a voltage adapted to the MCU 231 so as to supply power to the MCU 231.

The charging portion further includes an output voltage sampling module 25 connected with the output terminal of the main charging circuit 21 and the output voltage sampling end (the pin 2) of the MCU 231, and configured to sample the output voltage of the main charging circuit 21. The MCU 231 accordingly controls a charging process of the main charging circuit 21 according to a sampling result.

The charging portion further includes a battery voltage sampling module 26 connected with the positive electrode 11 and the negative electrode 12 of the starting power supply 1 as well as the input voltage sampling end (the pin 3) of the MCU 231, and configured to sample the voltage of the starting power supply 1. The MCU 231 accordingly controls a pre-charging process of the bypass charging circuit 22 and the charging process of the main charging circuit 21 according to a sampling result.

The charging portion further includes a current sampling module 27 connected with the clamping end Vout− of the jumper cable 2, the negative electrode 12 of the starting power supply 1 and the current sampling end (the pin 3) of the MCU 231, and capable of sampling the current flowing to the jumper cable 2 from the starting power supply 1. It can also sample reversely charging current flowing to the starting power supply 1 from the jumper cable 2. When reverse charging occurs, the MCU 231 can control the main charging circuit 21 or the bypass charging circuit 22 to be turned off in time to protect the starting power supply 1.

The charging portion further includes a temperature sampling module 28 which may be attached to the jumper cable 2 and connected with the jumper cable temperature sampling end (the pin 5) of the MCU 231. When it is detected that the temperature of the jumper cable 2 is overhigh, the MCU 231 can control the main charging circuit 21 or the bypass charging circuit 22 to be turned off in time to achieve over-temperature protection. It can also provide a audible and visible alarm via the pin 8 and the pin 9.

The charging portion further includes a displaying/alarming module 29 which is connected with the pin 8 and the pin 9 of the MCU 231. Specifically, the displaying/alarming module 29 may be buzzers, LED lamps/LED nixie tubes and the like. The displaying/alarming module 29 is configured for audible and visible alarm under the control of the MCU 231.

The charging portion further includes a reverse polarity detecting module 20 connected with the two clamping ends Vout+ and Vout− of the jumper cable 2 as well as a reverse polarity signal identification end of the MCU 231. When a prompt indicating reverse polarity connection is received from the reverse polarity detecting module 20, the MCU 231 may give a photoelectric alarm via the pin 8 and the pin 9. The reverse polarity detecting module 20 may include an optical coupler therein. The detection is performed by means of a diode of a transmitter of the optical coupler, the positive and negative electrodes of which are respectively connected to the negative and positive electrodes of the vehicle battery 3 in a correct connection. However, if the electrodes of the vehicle battery 3 are connected reversely, the positive electrode of the diode of the transmitter of the optical coupler is connected to the positive electrode of the battery, and the negative electrode of the diode of the transmitter of the optical coupler is connected to the negative electrode of the vehicle battery 3, and thus, the optical coupler may be triggered to be switched on, and a signal indicating a reverse connection of the vehicle battery 3 may be transmitted to the MCU 231 by the optical coupler.

Figure 5:
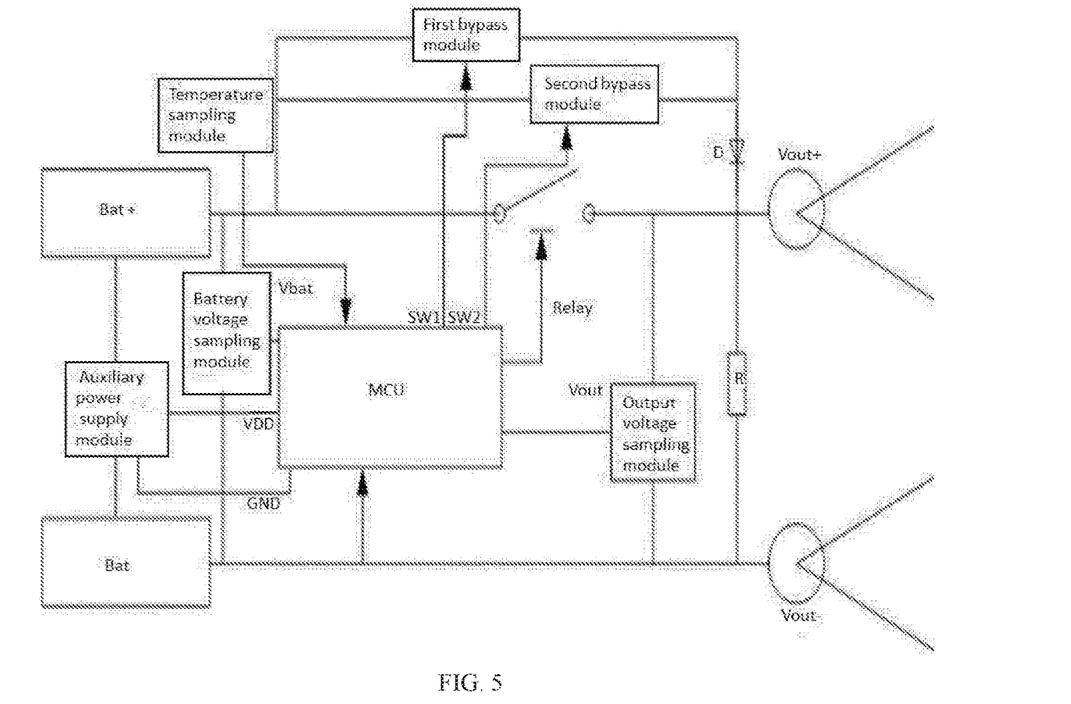
FIG. 5 is a diagram showing a circuit structure of a charging portion of a jumper cable according to a third embodiment of the present disclosure.

As different vehicle batteries 3 may have different resistance values, the vehicle batteries may not be accurately identified by using a bypass module with a fixed resistance value, and therefore, in combination of the first embodiment and the second embodiment, a third embodiment of the present disclosure provides another circuit structure of the above-mentioned charging portion. As shown in FIG. 5, the bypass charging circuit 22 in the present embodiment includes at least two sub-bypass charging circuits with different resistance values, wherein all the sub-bypass charging circuits are connected in parallel between the input terminals and the clamping ends of the jumper cable 2. Specifically, a plurality of bypass modules may be arranged on the basis of the second embodiment, and FIG. 5 shows an example with two bypass modules.

Correspondingly, the process that the controller 23 controls the bypass charging circuit 22 to pre-charge includes the step of circularly controlling, by the controller 23, all the sub-bypass charging circuits to be switched on to pre-charge the vehicle battery within a bypass charging period in turn.

The process that the controller 23 controls the main charging circuit 21 to charge includes the step of controlling, by the controller 23, the main charging circuit 21 to be switched on to charge the vehicle battery when it is detected that a relative relationship between an output voltage and an input voltage of a certain sub-bypass charging circuit meets the preset loading condition, such that the vehicle is started and ignited.

Adopted is a double-bypass structure as shown in FIG. 5, one bypass charging circuit corresponds to a large load with a high output voltage (e.g., a vehicle battery with relatively low resistance), and the other bypass charging circuit corresponds to a small load with a low output voltage (e.g., a vehicle battery with relatively high resistance). When the large load (with low resistance) is connected, the load can be identified (misidentified as short circuit may be avoided). When the small load (with high resistance) is connected, misidentified as open circuit can be avoided. The double-bypass structure has the main function of extending the loading range and is capable of identifying loads ranged from 4Ω to 2 K Ω.

Further, the third embodiment differs from the second embodiment in that a diode D of unidirectional conductivity property is used instead of the reverse polarity detecting module 20 in the second embodiment. The anode of the diode D is connected with each bypass module, and the cathode of the diode D is connected with the clamping end Vout+.

In combination with all the above-mentioned embodiments, a fourth embodiment of the present disclosure further provides a jumper cable for emergency startup of vehicles. As mentioned above, the present embodiment is mainly applicable to the situation that the energy stored in the vehicle battery is insufficient due to aging of the vehicle battery 3 or other factors. During actual applications, the energy storage capacity of the vehicle battery 3 may be various, the energy storage capacity of some vehicle batteries 3 may be modest, but some vehicle batteries 3 may be only capable of storing little power. In addition, it may also be considered that the power of the starting power supply 1 cannot be lost excessively or depleted too quickly. Therefore, in the fourth embodiment, the controller adopts different charging manners for different vehicle batteries 3.

When the vehicle battery 3 is pre-charged by the bypass charging circuit 22, the main charging circuit 21 is controlled to charge the vehicle battery 3 when it is detected that the relationship between the output voltage and the input voltage of the bypass charging circuit 22 meets the preset loading condition (for example, the output voltage is lower than the input voltage by 0.5V or more as described in the first embodiment), and the charging manner is related to a voltage value obtained after the vehicle battery 3 is pre-charged. In the present embodiment, two charging manners are provided, and two voltage ranges are set as judgement standards for choosing the charging manners, wherein voltages in a preset first voltage range are relatively low, for example, the voltages may be set within the range of 0.5V to 9V, and voltages in a preset second voltage range are relatively high, for example, the voltages may be set to be higher than 9V.

The charging manner corresponding to the first voltage range is "pulse charging", which is applicable to one-button initiated vehicles. During each charging period of the main charging circuit and the number of charging times of the vehicle battery does not exceed a threshold of the number of charging times, if the controller 23 detects that voltage of the clamping ends is within the preset first voltage range after pre-charging, the main charging circuit 21 is controlled to be switched on per preset time interval, and kept for a first duration after being switched on every time so as to charge the vehicle battery 3.

For example, if the voltage of the clamping ends is in the range of 0.5V to 9V, it is considered that the voltage of the vehicle battery 3 is too low, the threshold of the number of charging times in each charging period of the main charging circuit 21 may be set as 7, that is, the number of charging times of the vehicle battery 3 is 7 at most, the main charging circuit 21 is controlled to be switched on every other 0.35 s to charge the vehicle battery 3 for 4 s until the voltage of the battery is raised to be higher than 9V, and the overall period is maintained for 30 s.

The "pulse charging" manner can not only achieve the normal ignition demand of the vehicle when the voltage of the vehicle battery 3 is excessively low, but also effectively solve the problem that the main charging circuit 21 has been switched on for an excessively long time to result in the excessively quick discharge of the battery of the starting power supply 1 to deplete the battery. The situation that the vehicle battery has been thoroughly damaged can be effectively solved. Even, it is possible that the jumper cable is directly connected to positive and negative electrodes of a starting motor instead of the vehicle battery 3.

The charging manner corresponding to the second voltage range is "drop detection charging", which is applicable to both one-button initiated vehicles and vehicles initiated by turning a key. If the controller 23 detects that the voltage of the clamping ends is within the preset second voltage range after pre-charging, and then, a drop amount in a preset drop detection duration exceeds a preset first drop threshold, the main charging circuit 21 is Controlled to be switched on and kept in the turned-on state within a second duration so as to charge the vehicle battery 3.

For example, if the voltage of the clamping ends is higher than 9V, it is determined that the voltage of the clamping ends enables an ignition action to be generated only when it is detected that the drop amount in the preset drop detection duration exceeds the preset first drop threshold. In order to ensure that ignition proceeds smoothly, the main charging circuit 21 needs to be controlled to be switched on, thereby charging the vehicle battery 3 by means of the starting power supply 1 to supplement power. For example, the preset drop detection duration may be set as 100 ms, the preset first drop threshold may be set as 0.75V, and the second duration may be set as 3 s.

Besides, only the bypass charging circuit 22 is switched on, there is generally only 0.51 A lost at most due to a resistor R of the bypass charging circuit 22, which would not greatly affect the power of the battery of the starting power supply 1.

This way of detecting vehicle ignition by means of detecting the drop of the voltage of the battery 3 can greatly reduce the power loss of the starting power supply 1, thus increasing the number of ignition times and prolong the service life of the battery.

Further, the total working time of the bypass charging circuit 22 and the main charging circuit 21 may be set as 30 s, and then, the jumper cable 2 goes to sleep, and there is only uA-level (microampere level) current, and therefore, the loss is further reduced.

Further, the vehicle battery 3 needs to be charged during start and ignition to ensure that the ignition can be achieved, the user may start and ignite a vehicle at any moment within a respective charging period of the main charging circuit, it is possible that the main charging circuit 21 is suddenly controlled to be turned off to cause starting failure when ignition is performed at the last moment within the charging period, in addition, if a relay is used for the main switch 211 of the main charging circuit 21, when subjected to a large current at the moment that the vehicle is started, the relay may be turned off to cause a risk that the relay is firmly stuck. In order to eliminate this risk, the time that the main charging circuit 21 is switched on needs to be appropriately prolonged when the ignition action is detected at the last moment.

Therefore, if the controller 23 detects that a voltage decrease of the input terminals exceeds a preset second drop threshold and the voltage of the input terminals is lower than a preset lower limit within the last reserved duration of each charging period of the main charging circuit, the main charging circuit 21 is controlled to be further kept in the turned-on state within a subsequently preset prolonged duration.

For example, the last reserved duration of the charging period of the main charging circuit 21 may be set as 1.5 s, the preset second drop threshold may be set as 1V, the value of the lower limit may be set as 12V, and the preset prolonged duration may be set as 3 s. Within the last 1.5 s, if it is detected that the voltage decrease of the input terminals is higher than 1V and the voltage of the input terminals is lower than a fixed value 12V, it is determined that starting and igniting actions of the vehicle occur, and the controller 23 needs to control the main charging circuit 21 to be further kept in the turned-on state within the prolonged period 3 s.

Further, the controller 23 detects whether the relative relationship between the output voltage and the input voltage of the bypass charging circuit 22 meets the preset loading condition in the following manners: it is determined that the preset loading condition is met when it is detected that the voltage of the damping ends is continuously lower than the voltage of the input terminals by a preset value within a third duration. The third duration may be set as 0.3 s, the preset value may be set as 0.3V, it is considered that the preset loading condition is met at present when it is detected that the voltage of the clamping ends is continuously lower than the voltage of the input terminals for 0.3 s, it may be further detected whether the voltage of the damping ends is within a preset first voltage range or second voltage range after pre-charging, and thus, the main charging circuit 21 is controlled to charge the vehicle battery 3 in a corresponding manner.

Further, the jumper cable 2 may fall off accidentally in a charging process. When the controller 23 controls the main charging circuit 21 to be switched on to charge the vehicle battery 3, if it is detected that a rise amount of the voltage of the clamping ends within a fourth duration exceeds a preset rise amount threshold, the main charging circuit 21 is controlled to be turned off, thereby avoiding meaningless discharge of the starting power supply 1, wherein the fourth duration may be set as 1 s, and the preset rise amount threshold may be set as 0.3V.

Further, in the present embodiment, when the load is relatively small, if the main charging circuit 21 and the bypass charging circuit 22 both maintain being switched on at the same time, the resistor of the bypass charging circuit 22 may generate heat seriously which increases the risk of failure of the resistor of the bypass charging circuit 22, and therefore, to protect the bypass charging circuit 22, the controller 23 may control the bypass charging circuit 22 to be turned off within most of the time when the main charging circuit 21 is switched on.

However, preferably, take in account that the action of turning on the main switch 211 in the main charging circuit 21 may be slow (for example, when the main switch 211 uses a relay), if the bypass charging circuit 22 is turned off immediately, at the moment, it is possible that the main switch 211 has not been switched on completely. In order to ensure that the output voltage can be detected by the controller 23 all the time, an overlapping turning-on time needs to be set when a switching occurs between the main charging circuit 21 and the bypass charging circuit 22. Similarly, when the main charging circuit 21 is turned off, in order to avoid the main charging circuit 21 from being turned off before the bypass charging circuit 22 is switched on, the bypass charging circuit 22 needs to be controlled to be switched on in advance, that is, there is a common turning-on/turning-off time for transition between the main charging circuit 21 and the bypass charging circuit 22. Therefore, within the charging period of the main charging circuit 21, the controller 23 controls the main charging circuit to be switched on before controlling the bypass charging circuit 22 to be turned off with a first preset delay duration interval, and the controller 23 controls the main charging circuit 21 to be turned off before controlling the bypass charging circuit 22 to be turned off with a second preset delay duration interval; and within the rest time, the bypass charging circuit 22 is controlled to be kept in a turned-on state.

Figure 6:
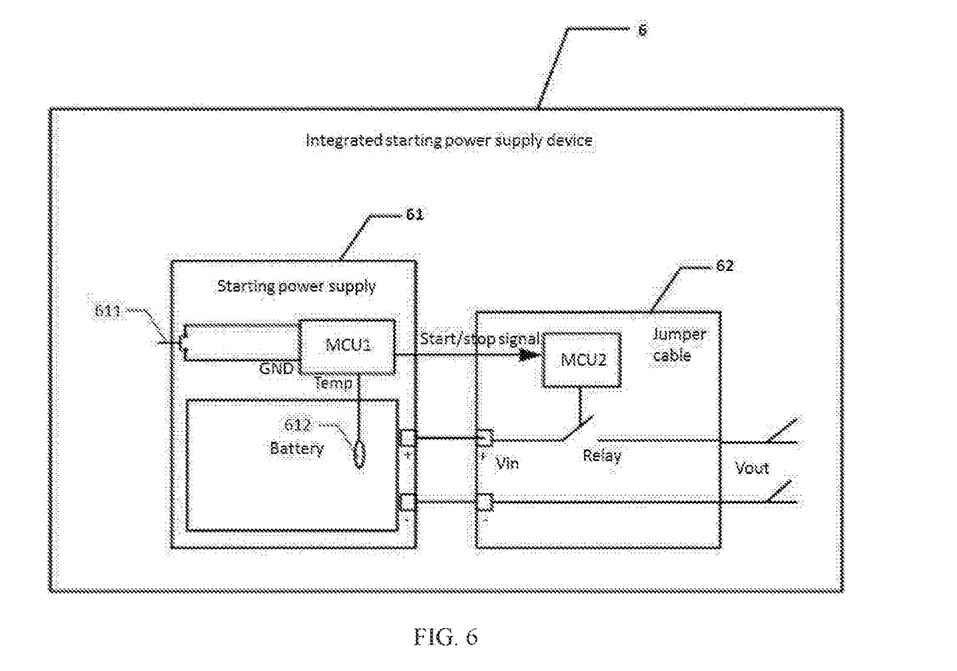
FIG. 6 is a diagram showing a structure of an integrated starting power supply with a built-in jumper cable according to a fifth embodiment of the present disclosure.

In combination with all the above-mentioned embodiments, a fifth embodiment of the present disclosure further provides an integrated starting power supply device provided with a built-in jumper cable. As shown in FIG. 6, the integrated starting power supply device 6 includes a starting power supply 61 and a jumper cable 62, wherein the starting power supply 61 in the present embodiment is the same as one of the starting power supplies 1 in all the above-mentioned embodiments, the jumper cable 62 in the present embodiment is the same as one of the jumper cables 2 in all the above-mentioned embodiments, the starting power supply 61 includes a battery portion and a MCU 1 to which a switch assembly 611 is further connected, and the switch assembly 611 may be designed to be in a button form. The starting power supply 61 realizes electric signal communication with a controller MCU 2 of the jumper cable 62 via the MCU 1.

When a vehicle needs to be ignited, the jumper cable 62 is activated by controlling the switch assembly 611 to be switched on (for example, by press a button); and when the jumper cable does not need to work, the jumper cable 62 stops working by controlling the switch assembly 611 to be turned off (for example, by pressing the button again), and thus, the jumper cable 62 is prevented from being switched on by malfunction. Specifically, when a user controls the switch assembly 611 to be switched on/off, the MCU 1 transmits a start/stop signal to the controller MCU 2 of the jumper cable 62, and the jumper cable 62 is controlled to start to work or stop working.

Further, the battery portion of the starting power supply 61 is provided with a temperature sampling module 612 which may be attached to the battery portion, connected with the MCU 1 and configured to detect the temperature of the battery portion. When the temperature sampling module 612 detects that the temperature of the battery portion is overhigh, the MCU 1 transmits an indication signal for stop to the controller MCU 2 of the jumper cable 62 to make the jumper cable 62 actively stop working, thereby avoiding explosion and the like caused by overhigh discharging temperature of the starting power supply 61, and disconnecting the starting power supply 61 and the vehicle battery in time.

Figure 7:
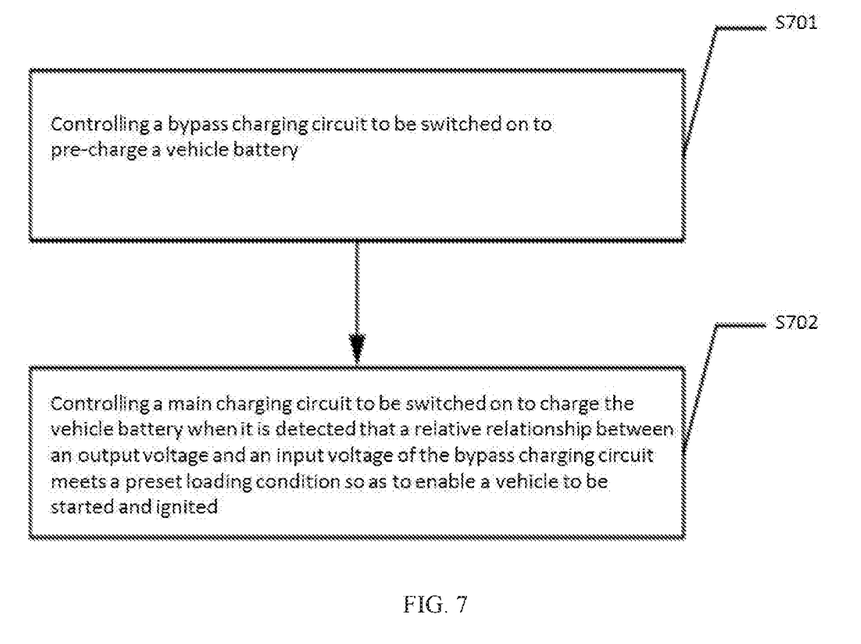
FIG. 7 is a flow chart showing a vehicle starting and igniting method according to a sixth embodiment of the present disclosure.

A sixth embodiment of the present disclosure provides a vehicle starting and igniting method, applied in combination with a jumper cable for emergency start of vehicles. The jumper cable includes input terminals configured to be connected with a starting power supply, clamping ends configured to be clamped on electrodes of a vehicle battery, and a charging portion connected between the input terminals and the clamping ends, wherein the charging portion is configured to charge the vehicle battery by using electric energy, received by the input terminals, from the starting power supply via the clamping ends. The jumper cable has a structure as shown in FIG. 1, and the charging portion has a structure as shown in FIG. 3. As shown in FIG. 7, the vehicle starting and igniting method includes the following steps.

In step S701, a bypass charging circuit is controlled to be switched on to pre-charge the vehicle battery.

The pre-charging purpose is to detect whether a load (that is, the vehicle battery) connected by the clamping ends is real and effective, thereby avoiding false triggering of the short circuit.

In step S702, a main charging circuit is controlled to be switched on to charge the vehicle battery when it is detected that a relative relationship between an output voltage and an input voltage of the bypass charging circuit meets a preset loading condition, so as to enable a vehicle to be started and ignited.

The preset loading condition is related to a relative relationship between the output voltage and the input voltage of the bypass charging circuit 22. When the relative relationship between the output voltage and the input voltage of the bypass charging circuit 22 meets the preset loading condition, it can be determined that the output terminal of the jumper cable 2 is connected to a load, and thus, the main charging circuit 21 can be controlled to be switched on to perform ignition judgment; or else, it can be determined that there is no load connected to output terminal of the jumper cable 2, and thus, ignition judgment is not performed. Specifically, the output voltage of the jumper cable 2 may be set to be lower than the input voltage by a certain value or more, such as lower than the input voltage by 0.3V or more.

In the sixth embodiment, the bypass charging circuit 22 may be controlled to pre-charge the vehicle battery 3 so as to identify whether the battery is a real battery or load, the main charging circuit 21 is controlled to charge the vehicle battery 3 when the vehicle battery 3 has been pre-charged to meet the preset loading condition, and therefore, the false triggering of the short circuit can be effectively avoided.

Figure 8:
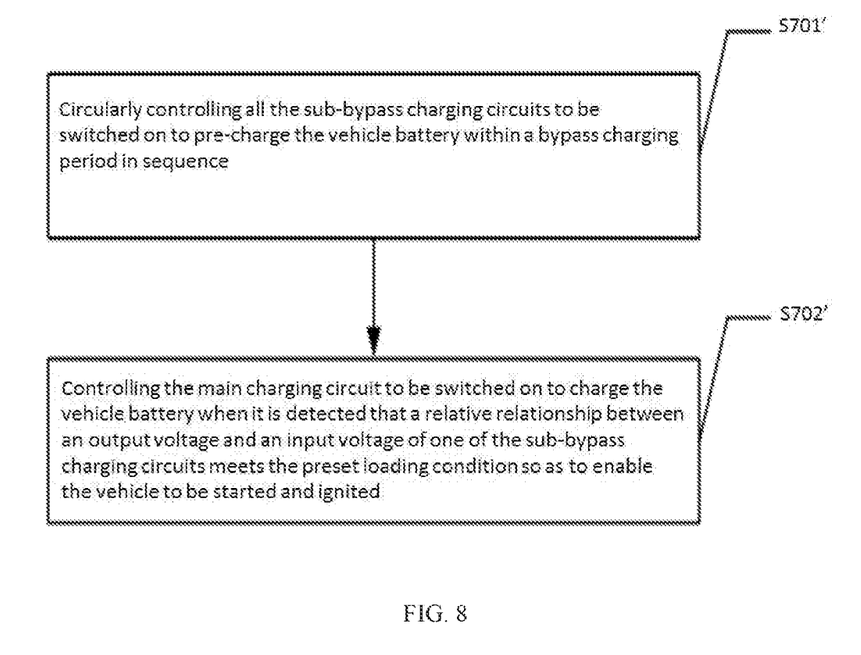
FIG. 8 is flow chart showing a vehicle starting and igniting method according to a seventh embodiment of the present disclosure.

In combination with the sixth embodiment, a seventh embodiment of the present disclosure provides a vehicle starting and igniting method. As shown in FIG. 8, wherein the bypass charging circuit includes at least two sub-bypass charging circuits with different resistance values, wherein all the sub-bypass charging circuits are connected in parallel between the input terminals and the clamping ends, details of which may refer to FIG. 5. The step S701 specifically includes the step S701' of circularly controlling all the sub-bypass charging circuits to be switched on to pre-charge the vehicle battery within a bypass charging period in sequence.

The step S702 specifically includes the step S702' of controlling the main charging circuit to be switched on to charge the vehicle battery when it is detected that a relative relationship between an output voltage and an input voltage of a certain sub-bypass charging circuit meets the preset loading condition so as to enable the vehicle to be started and ignited.

A double-bypass structure as shown in FIG. 5 is adopted, one circuit corresponds to a large load with a high output voltage (e.g., a vehicle battery with relatively low resistance), and the other circuit corresponds to a small load with a low output voltage (referring to a vehicle battery with relatively high resistance). When the large load (with low resistance) is connected, the load can be identified (misidentification of short circuit will not occur); and when the small load (with high resistance) is connected, the load will not be misidentified as open circuit. The double-bypass structure has the function of extending the loading range and is capable of identifying loads ranging from 4 ohms to 2 K ohms.

Figure 9:
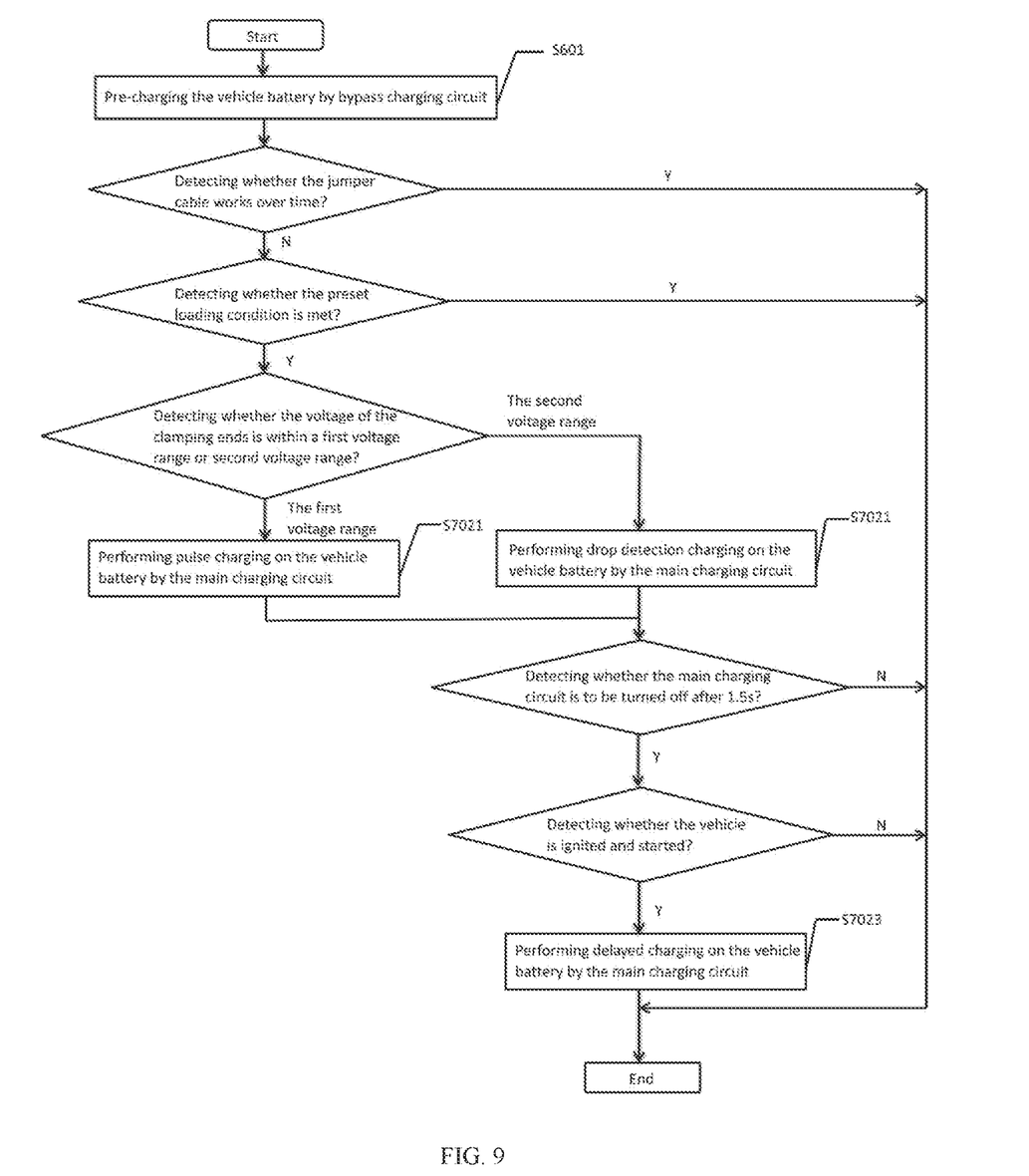
FIG. 9 is flow chart showing a vehicle starting and igniting method according to an eighth embodiment of the present disclosure.

In combination with the above-mentioned sixth and seventh embodiments, an eighth embodiment of the present disclosure further provides a vehicle starting and igniting method. As shown in FIG. 9, the step S702 includes the steps as follow.

Step S7021, during each charging period of the main charging circuit and the number of charging times of the vehicle battery does not exceed a threshold of the number of charging times, if it is detected that voltage of the clamping ends is within a preset first voltage range, the main charging circuit is controlled to be switched on once per preset time interval and kept in a turned-on state within a first duration after being switched on each time so as to charge the vehicle battery.

This step is "pulse charging", which is applicable to one-button initiated vehicles. For example, if the voltage of the clamping ends is in the range of 0.5V to 9V, it is determined that the voltage of the vehicle battery 3 is too low, the threshold of the number of charging times in each charging period of the main charging circuit may be set as 7, that is, the number of charging times of the vehicle battery is 7 at most, the main charging circuit is controlled to be switched on every other 0.35 s to charge the vehicle battery 3 for 4 s until the voltage of the battery is raised to be higher than 9V, and the overall circulation is maintained for 30 s.

The "pulse charging" manner can not only achieve the normal ignition demand of the vehicle when the voltage of the vehicle battery is excessively low, but also solve the problem that the main charging circuit 21 has been switched on for an excessively long time to result in the excessively quick discharge of the battery of the starting power supply to deplete the battery. The vehicle battery is prevented from being thoroughly damaged. Even, it is possible that the jumper cable is directly connected to positive and negative electrodes of a starting motor instead of a vehicle battery.

In step S7022, if it is detected that the voltage of the clamping ends is within a preset second voltage range, and then, a drop amount in a preset drop detection duration exceeds a preset first drop threshold, the main charging circuit is controlled to be switched on and kept in the turned-on state within a second duration so as to charge the vehicle battery.

This step is "drop detection charging", which is applicable to both one-button initiated vehicles and vehicles initiated by turning a key. If it is detected that the voltage of the clamping ends is within the preset second voltage range after pre-charging, and then, a drop amount in a preset drop detection duration exceeds a preset first drop threshold, the main charging circuit is Controlled to be switched on and kept in the turned-on state within a second duration so as to charge the vehicle battery.

For example, if the voltage of the clamping ends is higher than 9V, it is determined that the voltage of the clamping ends enables an ignition action to be generated only when it is detected that the drop amount in the preset drop detection duration exceeds the preset first drop threshold. In order to ensure that ignition proceeds smoothly, the main charging circuit needs to be controlled to be switched on, thereby charging the vehicle battery by means of the starting power supply to supplement power. For example, the preset drop detection duration may be set as 100 ms, the preset first drop threshold may be set as 0.75V, and the second duration may be set as 3 s.

Besides, only the bypass charging circuit 22 is switched on, there is generally only 0.51 A lost at most by a resistor R of the bypass charging circuit 22, which would not greatly affect the power of the battery of the starting power supply 1.

This way of detecting vehicle ignition by detecting the drop of the voltage of the battery 3 can greatly reduce the power loss of the starting power supply 1, thus increasing the number of ignition times and prolong the service life of the battery.

Further, the vehicle battery needs to be charged during start and ignition to ensure that the ignition can be achieved, the user may start and ignite a vehicle at any moment within each charging period of the main charging circuit, it is possible that the main charging circuit is suddenly controlled to be turned off to cause starting failure when ignition is performed at the last moment within the charging period, in addition, if a relay is used for the main switch of the main charging circuit, when subjected to a large current at the moment that the vehicle is started, the relay may be turned off to cause a risk that the relay is firmly stuck. In order to eliminate this risk, the time that the main charging circuit is switched on needs to be appropriately prolonged when the ignition action is detected at the last moment. Therefore, the method further includes a step S7023 in which if it is detected that a drop amount of the voltage of the clamping ends exceeds a preset second drop threshold within the last reserved duration of the respective charging period of the main charging circuit, the main charging circuit is controlled to further maintain the turned-on state within a subsequently preset prolonged duration.

For example, the last reserved duration of the charging period of the main charging circuit 21 may be set as 1.5 s, the preset second drop threshold may be set as 1V, the value of the lower limit may be set as 12V, and the preset prolonged duration may be set as 3 s. Within the last 1.5 s, if it is detected that the voltage decrease of the input terminals is greater than 1V and the voltage of the input terminals is lower than the fixed value 12V, it is determined that starting and igniting actions of the vehicle occur, and the controller 23 needs to control the main charging circuit 21 to be further kept in the turned-on state within the prolonged 3 s.

In addition, in the step S702, it may detect whether the relative relationship between the output voltage and the input voltage of the bypass charging circuit meets the preset loading condition in the following manners: it is determined that the preset loading condition is met when it is detected that the voltage of the clamping ends is continuously lower than the voltage of the input terminals by a preset value within a third duration. The third duration may be set as 0.3 s, the preset value may be set as 0.3V it is considered that the preset loading condition is met at present when it is detected that the voltage of the clamping ends is continuously lower than the voltage of the input terminals for 0.3 s, it may be further detected whether the voltage of the clamping ends is within a preset first voltage range or second voltage range after pre-charging, and thus, the main charging circuit is controlled to charge the vehicle battery in a corresponding manner.

Further, the jumper cable may fall off accidentally in a charging process. The step S702 may further include: when the main charging circuit is controlled to be switched on to charge the vehicle battery, if it is detected that a rise amount of the voltage of the clamping ends within a fourth duration exceeds a preset rise amount threshold, the main charging circuit 21 is controlled to be turned off, thereby avoiding meaningless discharge of the starting power supply 1, wherein the fourth duration may be set as is, and the preset rise amount threshold may be set as 0.3V.

Further, when performing the step S701 and the step S702 to switch the circuits, the main charging circuit is controlled to be switched on and then the bypass charging circuit is controlled to be turned off after a first preset delay duration, and the main charging circuit is Controlled to be turned off and then the bypass charging circuit is controlled to be turned off after a second preset delay duration; and within the rest time, the bypass charging circuit is controlled to be kept in a turned-on state. The specific principle is described as that in the fourth embodiment, the detailed descriptions will not be repeated herein.

In summary, in all the embodiments of the present disclosure, the vehicle battery is pre-charged by the bypass charging circuit so as to identify whether the battery is a real battery or load, the main charging circuit is controlled to charge the vehicle battery when the vehicle battery has been pre-charged to meet the preset loading condition, and therefore, the false triggering of the short circuit can be effectively avoided. Meanwhile, forcedly turning on a button is canceled, so that unnecessary operation processes are reduced, and injury caused by short circuit of the jumper cable is avoided in advance. In addition, the pulse charging manner is adopted, so that the power of the starting power supply can be effectively prevented from being depleted, the vehicle battery is effectively prevented from being thoroughly damaged. Even, it is possible that the jumper cable is not connected to the vehicle battery, but directly connected to positive and negative electrodes of a starting motor. Moreover, due to the delayed disconnection function of the relay when the vehicle is started, the turn-off current stress of the main switch (the relay or other switches) in the main charging circuit can be effectively reduced, and service life of the relay can be effectively prolonged.

The present disclosure provides the jumper cable applicable to be matched with the emergency starting power supply of the vehicle, the emergency starting power supply for the vehicle, and the jumper cable for the vehicle, wherein the jumper cable may also be integrated with the starting power supply.

The above descriptions are merely preferred embodiments of the present disclosure and are not intended to limit the present disclosure. Any modifications, equivalent replacements, improvements and the like within the spirit and principle of the present disclosure shall fall within the protection scope of the present disclosure.

What is claimed is:

1. A jumper cable for a starting power supply, comprising:
   input terminals configured to be connected with a battery portion of a starting power supply;
   output terminals configured to be connected to a load;
   a switching circuit connected in circuit between the input terminals and the output terminals;
   a bypass module connected in circuit between the input terminals and the output terminals; and
   a microcontroller connected to the switching circuit and the bypass module,
   wherein the microcontroller is configured to output a driving signal based on an output voltage and an input voltage of the bypass module, and the switching circuit is selectively switched on based on the driving signal of the microcontroller and connects the battery portion to the load.

2. The jumper cable of claim 1, wherein the microcontroller is further configured to detect one or more of the following: an output voltage of the switching circuit, a voltage of the battery portion of the starting power supply device, a temperature of the battery portion, a temperature of the jumper cable, a current flowing to the jumper cable from the battery portion of the stating power supply and a current reversely flowing to the battery portion from the jumper cable.

3. The jumper cable of claim 1, further comprising a reverse polarity detecting module connected to the microcontroller, wherein the reverse polarity detecting module is configured to detect whether the output terminals are reversely connected to electrodes of the load.

4. The jumper cable of claim 1, wherein the switching circuit comprises one or more of: relay and MOSFET.

5. The jumper cable of claim 1, wherein the bypass module comprises at least two sub-bypass charging circuits with different resistance values, the at least two sub-bypass charging circuits take turns to output an output voltage within a first period, and
   wherein the microcontroller is configured to output the driving signal when it is detected that a relative relationship between an output voltage and an input voltage of one of the at least two sub-bypass charging circuit meets a preset loading condition.

6. The jumper cable of claim 1, wherein the microcontroller is configured to output a driving signal when it is detected that a relative relationship between the output voltage and the input voltage of the bypass module meets a preset loading condition, and the preset loading condition is met when a voltage of the output terminals is continuously lower than a voltage of the input terminals by a preset value within a third duration.

7. A starting power supply device for a vehicle, comprising:
   a battery portion;
   output terminals configured to be connected to a vehicle or vehicle battery;
   a switching circuit connected in circuit between the battery portion and the output terminals;
   a bypass module connected in circuit between the battery portion and the output terminals; and
   a first microcontroller connected to the switching circuit and the bypass module, wherein the first microcontroller is configured to output a driving signal based on an output voltage of the bypass module and a voltage of the battery portion, and the switching circuit is selectively switched on based on the driving signal of the first microcontroller and connects the battery portion to the vehicle or vehicle battery.

8. The starting power supply device of claim 7, wherein the first microcontroller is configured to output the driving signal when it is detected that a relative relationship between the output voltage of the bypass module and the voltage of the battery portion meets a preset loading condition, and the switching circuit is selectively switched on based on the driving signal of the first microcontroller and connects the battery portion to the vehicle or vehicle battery.

9. The starting power supply device of claim 7, wherein the first microcontroller is further configured to detect one or more of the following: an output voltage of the switching circuit, a temperature of the battery portion, a current flowing to the output terminals from the battery portion, and a current reversely flowing to the battery portion from the output terminals.

10. The starting power supply device of claim 7, further comprising a reverse polarity detecting module connected to the first microcontroller, wherein the reverse polarity detecting module is configured to detect whether the output terminals are reversely connected to electrodes of the vehicle or vehicle battery.

11. The starting power supply device of claim 7, wherein the bypass module comprises at least two sub-bypass charging circuits with different resistance values, the at least two sub-bypass charging circuits take turns to be switched on and output an output voltage within a first period, and
   wherein the first microcontroller is configured to output the driving signal when it is detected that a relative relationship between the output voltage of one of the at least two sub-bypass charging circuit and the voltage of the battery portion meets a preset loading condition.

12. The starting power supply device of claim 8, wherein the preset loading condition is met when it is detected that the output voltage of the output terminals is continuously lower than the voltage of the battery portion by a preset value within a third duration.

13. The starting power supply device of claim 7, further comprising a second microcontroller, wherein the first microcontroller receives a signal from the second microcontroller and selectively controls the switching circuit to be switched on based on the signal.

14. The starting power supply device of claim 7, further comprising a switch assembly, wherein the first microcontroller selectively controls the switching circuit to be switched on based on a signal of the switch assembly.

15. The starting power supply device of claim 13, wherein the second microcontroller is configured to detect a temperature of the battery portion and transmit a signal of the temperature to the first microcontroller, and the first microcontroller controls the switching circuit to be switched off when the temperature of the battery portion is overhigh.

16. The starting power supply device of claim 7, wherein the bypass module comprises at least one switch, and the at least one switch comprises one or more of: relay, MOSFET, and optical coupler.

17. The starting power supply device of claim 7, wherein the switching circuit comprises at least one switch, and the at least one switch comprises one or more of: relay and MOSFET.

18. A vehicle starting and ignition method by using a starting power supply device of claim 7, comprising steps of:
   controlling the bypass module to be switched on to output a voltage;
   controlling the switching circuit to be switched on to connect the battery portion to the vehicle or vehicle battery when it is detected that a relative relationship between the output voltage of the bypass module and a voltage of the battery portion meets a preset loading condition; and controlling the bypass module to be switched on one or more times until the present loading condition is met.

19. The method of claim 18, wherein the bypass charging circuit comprises
   at least two sub-bypass charging circuits with different resistance values,
   the step of controlling the bypass module to be switched on to output a voltage comprises:
   circularly controlling all the sub-bypass charging circuits to be switched on within a preset period; and
   the step of controlling the switching circuit to be switched on to connect the battery portion to the vehicle or vehicle battery when it is detected that a relative relationship between the output voltage of the bypass module and a voltage of the battery portion meets a preset loading condition comprises: controlling the switch circuit to be switched on to connect the battery portion to the vehicle or vehicle battery when it is detected that a relative relationship between an output voltage of one of the at least two sub-bypass charging circuits and the voltage of the battery portion meets the preset loading condition.

20. The method of claim 18, wherein the preset loading condition is met when it is detected that a voltage of the output terminals is continuously lower than the voltage of the battery portion by a preset value within a third duration.

* * * * *